(12) United States Patent
Liu et al.

(10) Patent No.: US 8,174,801 B2
(45) Date of Patent: May 8, 2012

(54) CONTROLLING ARC ENERGY IN A HYBRID HIGH VOLTAGE DC CONTACTOR

(75) Inventors: Zhenning Liu, Mississauga (CA); Randy Fuller, Hillsburgh (CA); Parsa Mirmobin, Tucson, AZ (US); Guangjun Liu, Mississauga (CA)

(73) Assignee: Honeywell International, Inc., Morristown, NJ (US)

( * ) Notice: Subject to any disclaimer, the term of this patent is extended or adjusted under 35 U.S.C. 154(b) by 467 days.

(21) Appl. No.: 12/416,726

(22) Filed: Apr. 1, 2009

(65) Prior Publication Data

US 2010/0254046 A1 Oct. 7, 2010

(51) Int. Cl.
*H01H 9/30* (2006.01)
*H01H 9/56* (2006.01)
*H01H 73/18* (2006.01)

(52) U.S. Cl. .......................................... 361/13

(58) Field of Classification Search .................. 361/2–13
See application file for complete search history.

(56) References Cited

U.S. PATENT DOCUMENTS

| | | | |
|---|---|---|---|
| 4,700,256 A | 10/1987 | Howell | |
| 4,816,958 A | 3/1989 | Beibel et al. | |
| 5,626,658 A | 5/1997 | McArdle | |
| 6,072,673 A * | 6/2000 | Chen et al. | 361/9 |
| 6,226,166 B1 | 5/2001 | Gumley et al. | |
| 6,956,725 B2 | 10/2005 | Boughton et al. | |
| 7,079,363 B2 | 7/2006 | Chung | |
| 7,145,758 B2 * | 12/2006 | King et al. | 361/3 |
| 7,149,063 B2 | 12/2006 | Bryan et al. | |
| 7,817,382 B2 * | 10/2010 | Yu et al. | 361/13 |
| 2002/0039268 A1 | 4/2002 | Bryan et al. | |
| 2007/0108845 A1 * | 5/2007 | Crane | 307/116 |
| 2008/0143462 A1 | 6/2008 | Belisle et al. | |

FOREIGN PATENT DOCUMENTS

EP 1480241 B1 1/2006

OTHER PUBLICATIONS

U.S. Appl. No. 11/968,314, filed Jan. 2, 2008, Yu et al.
European Search Report dated Jul. 2, 2010, European Application No. 10155983.9.

* cited by examiner

*Primary Examiner* — Rexford Barnie
*Assistant Examiner* — Christopher Clark
(74) *Attorney, Agent, or Firm* — Shimokaji & Assoc. PC

(57) ABSTRACT

A high voltage direct current (HVDC) power distribution system comprises at least one power bus; at least one load conductor; and a hybrid contactor for interconnecting the at least one power bus and the at least one load conductor and through which inductive energy passes upon disconnection of the at least one load conductor from the at least one power bus. A first portion of the inductive energy passes through the hybrid contactor as an arc. A second portion of the inductive energy passes through the hybrid contactor as resistively dissipated heat.

18 Claims, 4 Drawing Sheets

CONTROLLING ARC ENERGY IN A HYBRID HIGH VOLTAGE DC CONTACTOR

CROSS-REFERENCE TO RELATED APPLICATIONS

The present invention is related to commonly-assigned application Ser. No. 11/968,314 entitled "HYBRID HIGH VOLTAGE DC CONTACTOR WITH ARC ENERGY DIVERSION" filed Jan. 2, 2008

BACKGROUND OF THE INVENTION

The present invention generally relates to control of electrical power distribution and more particularly, employment of high voltage direct current (HVDC) contactors for switching under conditions in which a DC load may be present in a circuit.

There is a growing need for HVDC power distribution systems in vehicles. For example, use of HVDC electrical power on aircraft such as the so-called More Electric Aircraft (MEA) is potentially attractive for low-loss distribution while maintaining relatively low electrical system weight.

Some of the challenges associated with the use of HVDC systems include improving the reliability and reducing size and weight of key components in the power distribution system, such as electric load control units (ELCUs) or remote power controllers (RPCs) for load control and feeder protection, and primary bus switching contactors, which mainly operate on an electromechanical principle. These current interrupting devices generally include a pair of mechanical contacts between the HVDC source and a load path which can rapidly separate either by means of electromechanical force upon an open command, or when mechanically "bouncing" during a closing transition upon a close command. When the contacts become separated, an electric arc may form as a result of the inductive energy stored in the connected circuit. Unlike AC applications, where the arc is self extinguished due to zero crossing of the AC current, the arc generated in an HVDC contactors will continue to carry current until the current eventually ceases as result of further opening of the contacts. This generates heat in the contact area and gradually erodes the surface of the contacts after repeated application. Use of higher operating voltages exacerbates this phenomenon. Various methods have been developed for HVDC contactors to suppress arcing using different arc chamber configurations and materials, which are structured to rapidly increase arc voltage. Also hybrid HVDC contactor concepts have been proposed whereby semiconductor switching devices are connected in parallel with the main electromechanical power switching contacts to bypass (or absorb) the entire energy generated during the switching transients, which would, otherwise, cause an arc. Some prior art HVDC contactors may employ positive temperature coefficient (PTC) materials connected in parallel with the main electromechanical contacts to convert the arc energy generated during contactor switching operation into heat dissipated in the PTC device.

As can be seen, there is a need to provide improved hybrid HVDC contactors and HVDC circuit interruption techniques. In particular there is a need to provide for circuit interruption with controlled arc energy

SUMMARY OF THE INVENTION

In one aspect of the present invention, a high voltage direct current (HVDC) power distribution system comprises at least one power bus; at least one load conductor; a hybrid contactor for interconnecting the at least one power bus and the at least one load conductor and through which inductive energy passes upon disconnection of the at least one load conductor from the at least one power bus; wherein a first portion of the inductive energy passes through the hybrid contactor as an arc; and wherein a second portion of the inductive energy passes through the hybrid contactor as resistively dissipated heat.

In another aspect of the present invention, a hybrid HVDC contactor comprises a main contactor having movable contacts; a controlled solid state switch for shunting inductive energy from the contacts during arcing between the contacts; and wherein an amount of shunted inductive energy is insufficient to extinguish an arc between the contacts, whereby inductive energy is distributed between shunted inductive energy and arc energy.

In still another aspect of the present invention, a method for mitigating arcing effects in an HVDC contactor comprising the steps of: separating contacts of a contactor in a HVDC circuit; sensing an amount of inductive energy that develops at the contacts at the time of the separation of the contacts; shunting a first portion of the inductive energy away from the contacts; and passing a second portion of the inductive energy between the contacts as arc energy.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, embodiments of the present invention generally may provide a system for interrupting HVDC circuits while mitigating the effects of arcing between contacts of a mechanical contactor. More particularly, embodiments of the present invention may provide a system in which a first portion of arc energy is shunted away from the contacts during opening of the contacts while a second portion of the arc energy is allowed to pass between the opening contacts.

Embodiments of the present invention may be useful in distributing HVDC power in an aircraft.

Figure 1:
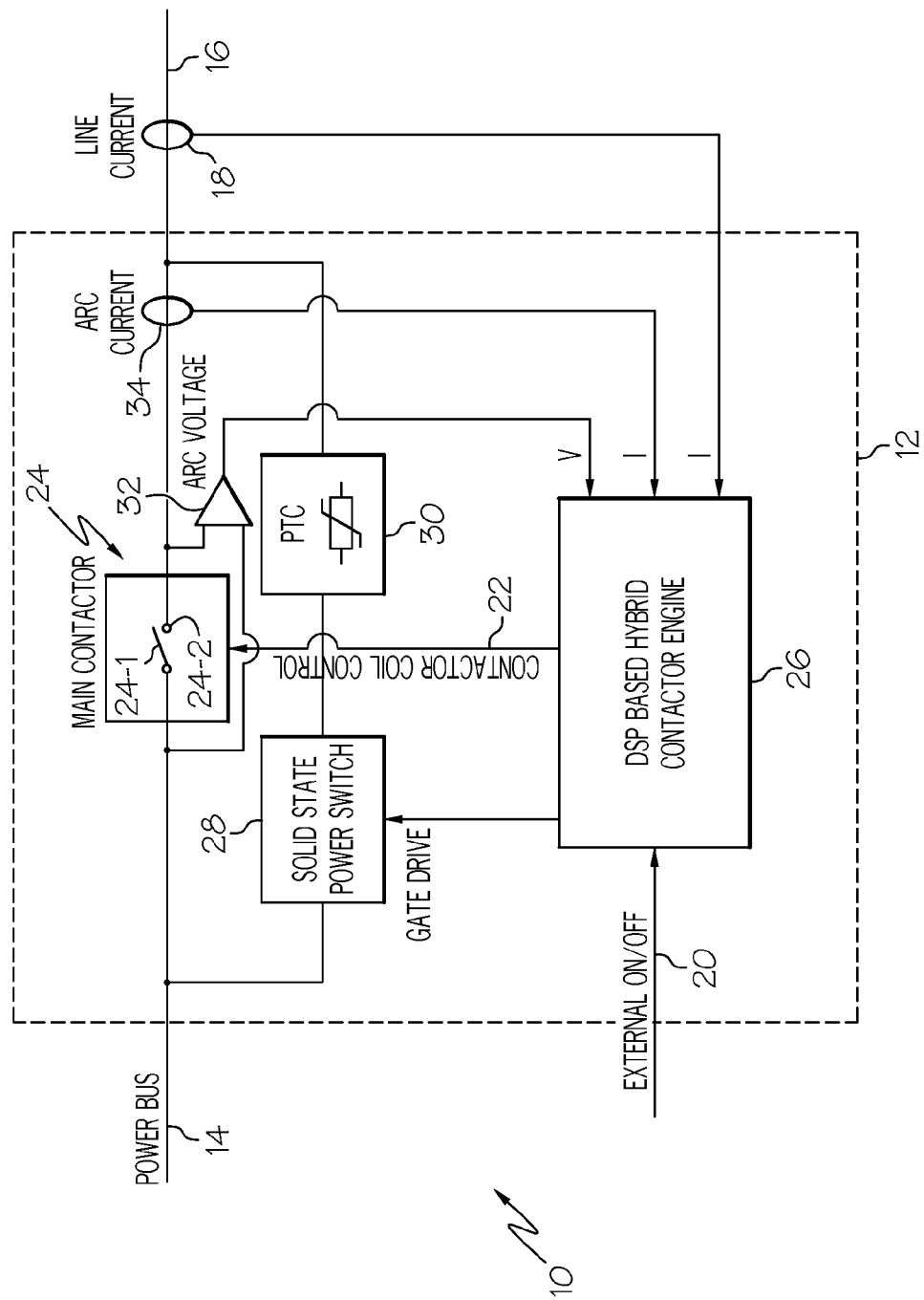
FIG. 1 is a block diagram of a power distribution system for HVDC in accordance with an embodiment of the present invention.

Referring now to FIG. 1 there is shown a block diagram of portion of a HVDC power system 10 which may comprise a hybrid HVDC contactor 12. The power system 10 may also comprise a power bus 14, a load conductor 16 and a line current sensor 18. The hybrid HVDC contactor 12 (hereinafter "the hybrid contactor 12") may be positioned so that it may interconnect the power bus 14 and the load conductor 16. The hybrid contactor 12 may connect the load conductor 16 to the power bus 14 or disconnect the load conductor 16 from the power bus 14 upon receipt of an appropriate external ON/OFF command 20. The contactor may also disconnect or re-connect the power bus 14 and the load conductor 16 responsively to an internally-generated ON/OFF command 22 (hereinafter the internal command 22). An internal command 22 may be generated responsively to an over-current condition sensed by the line current sensor 18. In that case, the internal command may be an OFF command and the hybrid contactor 12 may disconnect the load conductor 16 from the power bus 14.

The hybrid contactor 12 may comprise a main contactor 24 with contacts 24-1 and 24-2. The main contactor 24 may be a conventional coil-driven electromechanical contactor constructed with spring-actuated contacts. The main contactor may be provided with a conventional degree of tolerance for arcing. The hybrid contactor 12 may further comprise a contactor engine 26, a solid state power switch 28, a positive temperature coefficient (PTC) resistor element 30 (hereinafter "the PTC 30"), an arc voltage sensor 32 and an arc current sensor 34. The contactor engine 26 may be a digital signal processor (DSP) based controller. The solid state switch 28 may be a conventional solid state switch and may operate responsively to a determined duty-cycle or a determined gate drive voltage.

Upon connecting or disconnecting the power bus 14 and the load conductor 16, arcing may develop between the contacts 24-1 and 24-2 as a result of inductive energy. In an exemplary embodiment of the invention, the hybrid contactor 12 may shunt some HVDC current to the solid state switch 28 and the PTC 30 during separation of the contacts 24-1 and 24-2. In this regard, the hybrid contactor 12 may be considered to shunt a portion of the inductive energy to the PTC 30. The PTC 30 may absorb the shunted inductive energy and dissipate the energy as resistively dissipated heat. However, as will be explained later herein, only a portion of the inductive energy may be shunted away from the contacts 24-1 and 24-2. Arcing may be allowed to continue in the main contactor 24 at an energy level lower than that which would otherwise be present without shunting.

As a consequence of apportioning the inductive energy, arcing erosion of the contacts 24-1 and 24-2 may be mitigated. Because a portion of the inductive energy may pass through the contacts 24-1 and 24-2, the solid state switch 28 and the PTC 30 may shunt only a portion of the inductive energy. The portion of inductive energy shunted to the PTC 30 may be controlled at a level that may be tolerated by the PTC 30 and the solid state switch 28.

Figure 2:
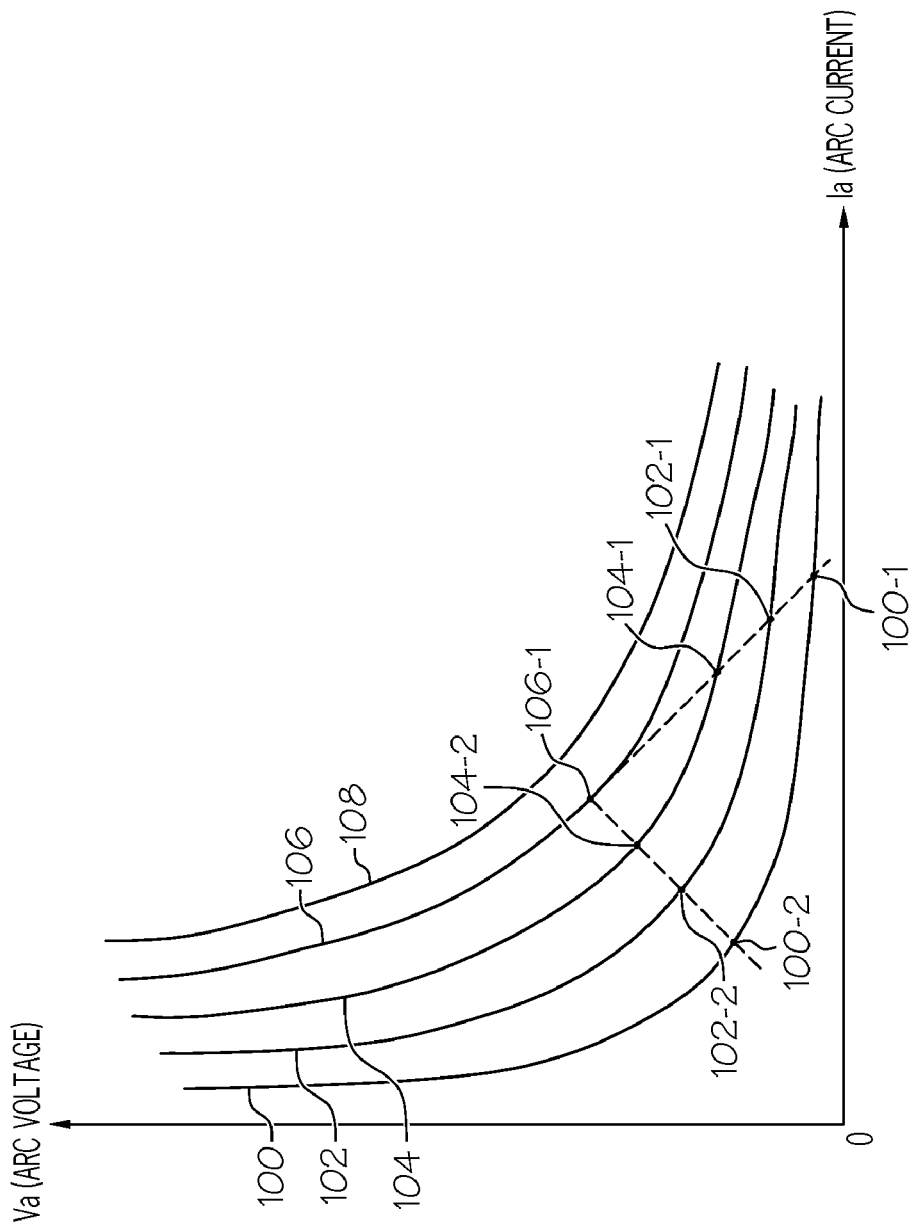
FIG. 2 is a set of graph lines portraying a relationship between arc current and arc voltage for various arc lengths in accordance with an embodiment of the present invention.

Referring now to FIG. 2, a series of graph lines show various combinations of arc voltages Va and arc currents Ia at which arcing may be initiated and sustained between contacts 24-1 and 24-2 of the hybrid contactor 12 during interruption of current. Inductively-induced surge voltages and currents may arise in the hybrid contactor 12 during such an interruption. A graph line 100 may represent an arc-initiation relationship between voltage Va and current Ia when the contacts 24-1 and 24-2 are separated by a first distance d1 (e.g. 0.5 millimeter [mm]). A graph line 102 may represent an arc-initiation relationship between Va and Ia when the contacts 24-1 and 24-2 are separated by a second distance d2 (e.g. 1.0 mm). In other words, to use graph line 100 as an example, at a contact spacing of d1, an arc may develop at a surge voltage at a graph-line-100 value of Va and a surge current at a graph-line-100 value of Ia. An arc, at the spacing d1 may develop at any combination of Va and Ia on the graph line 100. There always exists a minimum arc power point, e.g. point 100-2, on the graph line 100 such that the product Va*Ia, the arc power, at any other point on the graph 100 is always greater than that at point 100-2.

It may be seen that as spacing between the contacts 24-1 and 24-2 increases, the product Va*Ia, i.e. the arc power, must become larger in order for an arc to remain sustained.

Referring again to graph line 100, a point 100-1 may represent a minimum voltage Va for the graph line 100. Typically, an uncontrolled arc between the contacts 24-1 and 24-2 may initiate at this minimum voltage Va represented by the point 100-1. It may be noted that the arc current Ia at the point 100-1 is relatively high, as compared to arc current at points to the left of point 100-1. As a result, the arc power, as well as its energy contained between the contacts 24-1 and 24-2 at the relatively high current value of point 100-1 may be greater than arc power at the minimum arc power point 100-2. Such an uncontrolled arc may be represented to progress through a series of points 102-1, 104-1 and 106-1 as the contacts 24-1 and 24-2 may continue to separate from one another.

A conventional HVDC main contactor such as the main contactor 24 may be capable of withstanding a number of repeated operations during which uncontrolled arcing may occur. However, repeated uncontrolled arcing may eventually produce failure or reduced reliability of the main contactor 24. But if arcing were to occur at a lower arc power level, then the useful life of the main contactor 24 may be extended. In other words, useful life of the main contactor 24 may be extended if arc power associated with every contact spacing were made lower than at points 100-1, 102-1, 104-1 and 106-1. For example, if arcing were to occur at a points 100-2, 102-2, 104-2 and 106-1, then potential damage to the contacts 24-1 and 24-2 may be reduced.

In an exemplary embodiment of the present invention, the hybrid contactor 12 may produce controlled arcing that may occur at lower current than in the uncontrolled arcing represented by the points 100-1, 102-1, 104-1 and 106-1.

Referring back to FIG. 1 and further to FIG. 2 the contactor engine 26 may be programmed to calculate a distance between the contacts 24-1 and 24-1 during separation. Based on a determined distance, the contactor engine 26 may perform a comparison with a Va versus Ia relationship for that distance (e.g., the graph lines 100, 102, 104, 106 and 108). The contactor may then determine an amount of arc current that must be shunted around the main contactor in order to produce a condition in which arcing occurs at a point to the left of a minimum arc voltage point for that distance. For example, at the distance d1 the contactor engine 26 may determine how much current must be shunted so that arcing occurs at a point to the left of point 100-1. In an ideal case, the determined shunted current may result in arcing at a point such as the point 100-2 where arcing energy is at a minimum. The contactor engine 26 may be programmed to produce this ideal condition if possible.

However, if the load conductor 16 is carrying a particularly high current load or if a load has a particularly high inductive component this ideal case may not be achievable. Therefore, the contactor engine 26 may also be programmed so that the PTC 30 is not subjected to a level of shunting current that may exceed its capability for dissipating energy. In other words, the contactor 26 may be programmed so that shunting current level is chosen to minimize arc energy or to limit shunting current at a level that may be tolerated by the PTC 30. The contactor engine 26 may be programmed to select, whichever of these shunt current levels is lower. It may be noted that, irrespective of which level is selected by the contactor engine 26, any diminishment of arcing current may be beneficial for extending the useful life of the main contactor 24 even if arcing does not occur at the minimum-energy set of points 100-2, 102-2, 104-2 and 106-1.

The contactor engine 26 may calculate distance between the contacts 24-1 and 24-1 by performing a calculation in accordance with the following expression.

$$d = \tfrac{1}{2}\epsilon * \{A/\!\int i * v \, dt\} * v^2 \quad \text{equation (1)}$$

where:
d=distance between contacts
ϵ=permittivity of material between contacts (e.g. vacuum or nitrogen)
A=contact area
i=monitored arc current at the arc current sensor 34
v=monitored arc voltage at the arc voltage sensor 32.

Alternatively, the contactor engine 26 may be programmed with a first order approximation of contact spacing vs. time relationship for the main contactor 24. For example, a particular type of main contactor may have a travel time of about 5 milliseconds to achieve contact separation spacing of about 2 mm. In that case, the shunting current may be determined as a function of elapsed time from initial contact separation, with each millisecond corresponding to 0.4 mm of distance between contacts. This first order approximation may produce results that may be less precise than those attained by calculation based on equation 1. However, processing time in the contactor engine 26 may be lower if the equation 1 calculations are not performed.

Figure 3:
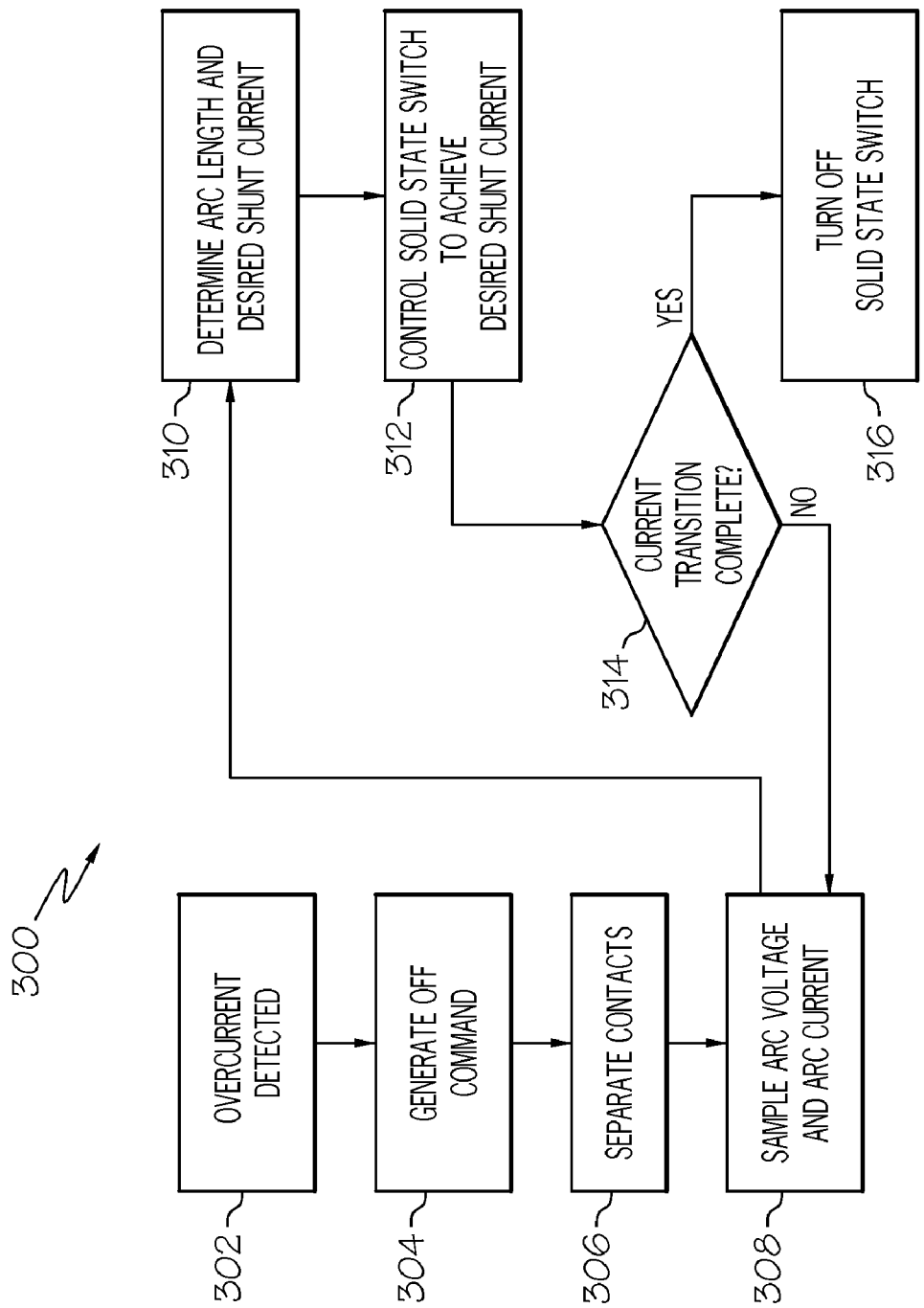
FIG. 3 is a flow chart of a method for operating a hybrid HVDC contactor in accordance with an embodiment of the present invention.

Referring now to FIG. 3, there is illustrated an exemplary operation of the hybrid contactor 12. FIG. 3 shows a method 300 in which the hybrid contactor 12 may mitigate arcing effects in the event of an overcurrent condition in the load conductor 16. In a step 302, an overcurrent condition may be detected (e.g. the line current sensor 18 may detect an overcurrent condition in the load conductor 16). In a step 304, an OFF command may be generated (e.g., the contactor engine 26 may generate an internal OFF command 22 to de-energize a coil of the main contactor 24). In a step 306, contacts of the main contactor may begin separating (e.g. the contact 24-1 and 24-2 may move away from one another).

In a step 308 arc voltage and arc current may be sampled (e.g., the arc voltage sensor 32 may sense a voltage drop across the main contactor 24 and the arc current sensor 34 may sense arc current). In a step 310 distance between the contacts (i.e., arc length) and desired shunt current may be determined (e.g., the contactor engine 26 may calculate distance between the contacts 24-1 and 24-1 in accordance with equation 1 using the arc voltage and the arc current sensed in step 308 as variables and an amount of shunt current needed to minimize arc power may be determined).

In a step 312, a solid state switch may be operated, responsively to signals from the contactor engine, to allow the desired amount of shunting current to pass through a PTC (e.g. the contactor engine 26 may generate a duty cycle for the switch 28 that corresponds to a shunting current flow that is sufficient to reduce arcing current so that arcing through the contacts may occur at the points 100-2, 102-2, 104-2 and 106-1).

In a step 314, a determination may be made as to whether a transition of fault current from the main contactor to the shunt path through the PTC is completed (e.g. the contactor engine 26 may determine whether or not arc current is present at the arc current sensor 34). In the event that arc current is present, steps 306 through 312 may be repeated. In the event that arc current is not present, a step 316 may be performed to produce a command to turn off the solid state switch.

Figure 4:
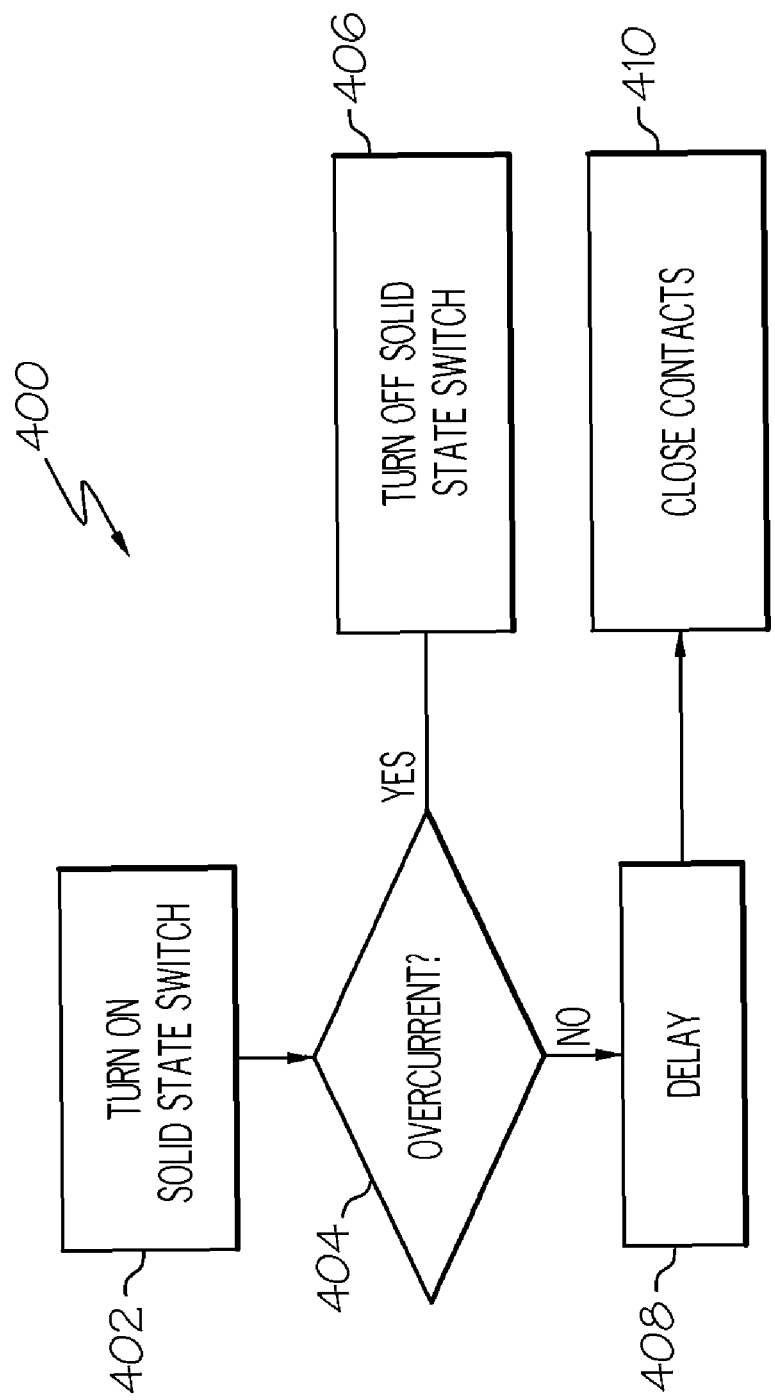
FIG. 4 is a flow chart of another method for operating a hybrid HVDC contactor in accordance with an embodiment of the present invention.

Referring now to FIG. 4, there is illustrated another exemplary operation of the hybrid contactor 12. FIG. 4 shows a method 400 in which the hybrid contactor 12 be employed to safely activate a circuit without causing excessive arcing due to contactor bouncing. In a step 402 the solid state switch may be turned on (e.g., the switch 28 may be turned on to allow current to pass through the PTC 30). In a step 404, a determination may be made as to whether a line overcurrent condition is present (e.g., the line current sensor 34 may sense current passing through the PTC 30 and the contactor engine 26 may receive the line current signal and then determine whether or not the line current is excessive). In the event of a determination of overcurrent is made, a step 406 may be initiated to turn off the solid state switch. In the event that a determination is made that an overcurrent does not exist, a step 408 may be initiated to begin a delay period after which a step 410 may be initiated to close contacts in the main contactor. Since a main current path may already be established through the PTC 30 upon closing of the main contactor 24, potential arcing due to bouncing of the contacts 24-1 and 24-2 may thus be minimized as a result of low level of initial current passing through the main contactor 24.

It may be seen that as a result of the sequence of steps of the method 400, initial (or inrush) current to a load may pass through the PTC 30. The PTC 30 may suppress potentially excessive current flow to the load conductor 16. The contactor engine 26 may programmed with data that is representative of characteristics of the PTC 30. Consequently, the contactor engine 26 may determine if excessive line current may potentially develop. This determination may be made even though actual excessive line current never commences.

It should be understood, of course, that the foregoing relates to exemplary embodiments of the invention and that modifications may be made without departing from the spirit and scope of the invention as set forth in the following claims.

We claim:

1. A high voltage direct current (HVDC) power distribution system comprising:
    at least one power bus;
    at least one load conductor;
    a hybrid contactor for interconnecting the at least one power bus and the at least one load conductor and through which inductive energy passes upon disconnection of the at least one load conductor from the at least one power bus wherein, the hybrid contactor includes:
        a first switch having movable contacts;
        a second switch in parallel to the first switch, the second switch for shunting inductive energy from the first switch wherein an amount of shunted inductive energy is insufficient to extinguish an arc between the contacts during arcing in the first switch; and
        a positive temperature coefficient resistor connected in series with the second switch,
    wherein a first portion of the inductive energy passes through the hybrid contactor as an arc; and
    wherein a second portion of the inductive energy passes through the hybrid contactor as resistively dissipated heat.

2. The HVDC power distribution system of claim 1 wherein, for a particular arc length, the first portion of inductive energy passes through the hybrid contactor as arc energy at an arc voltage that is higher than a minimum arc voltage for the particular arc length.

3. The HVDC power distribution system of claim 2;
  wherein arc length varies during disconnection of the at least one load conductor from the at least one power bus; and
  wherein during arc length variation the first portion of inductive energy passes through the hybrid contactor as arc energy at an arc voltage that is higher than a minimum arc voltage for any particular arc length.

4. The HVDC power distribution system of claim 1 wherein, for a particular arc length, the first portion of inductive energy passes through the hybrid contactor as arc energy at an arc current level that is lower than a maximum arc current level for the particular arc length.

5. The HVDC power distribution system of claim 4;
  wherein arc length varies during disconnection of the at least one load conductor from the at least one power bus; and
  wherein during arc length variation the first portion of inductive energy passes through the hybrid contactor as arc energy at an arc current level that is lower than a maximum arc current level for any particular arc length.

6. The HVDC power distribution system of claim 1 wherein, for a particular arc length, the first portion of inductive energy passes through the hybrid contactor as arc energy at an arc power level that is a minimum arc power level for the particular arc length.

7. The HVDC power distribution system of claim 6;
  wherein arc length varies during disconnection of the at least one load conductor from the at least one power bus; and
  wherein during arc length variation the first portion of inductive energy passes through the hybrid contactor as arc energy at an arc power level that is a minimum arc power level for any particular arc length.

8. A hybrid HVDC contactor comprising:
  a main contactor having movable contacts;
  a controlled solid state switch for shunting inductive energy from the contacts during arcing between the contacts; and
  a positive temperature coefficient resistor connected in series with the solid state switch,
  wherein an amount of shunted inductive energy is insufficient to extinguish an arc between the contacts, whereby inductive energy is distributed between shunted inductive energy and arc energy.

9. The hybrid HVDC contactor of claim 8 further comprising:
  a contactor engine for calculating an amount of the inductive energy to be shunted so that arcing between the contacts can continue at an energy level that is minimized for any particular arc length; and
  wherein the contactor engine controls the solid state power switch to shunt the calculated amount of inductive energy.

10. The hybrid HVDC contactor of claim 9 wherein the contactor engine calculates said amount of the inductive energy as a function of arc length in accordance with the expression;

$$d = \tfrac{1}{2}\epsilon * \{A/\int i * v\, dt\} * v^2$$

where:
  d=distance between the contacts=arc length;
  ϵ=permittivity of material between the contacts;
  A=area of the contacts;
  i =monitored arc current at an arc current sensor; and
  v =monitored arc voltage at an arc voltage sensor.

11. The hybrid HVDC contactor of claim 9 wherein the contactor engine calculated said amount of inductive energy as a function of arc length by determining elapsed time from initiation of the arcing and applying the determined elapsed time to a defined rate of separation of the contacts.

12. The hybrid HVDC contactor of claim 9 wherein the contactor engine produces a duty cycle for the solid state switch.

13. The hybrid HVDC contactor of claim 9 wherein the contactor produces engine gate drive voltage signals for the solid state switch.

14. A method for mitigating arcing effects in an HVDC contactor comprising the steps of:
  separating contacts of a contactor in a HVDC circuit;
  sensing an amount of inductive energy that develops at the contacts at the time of the separation of the contacts;
  shunting a first portion of the inductive energy away from the contacts through a switch connected in parallel to the contactor and into a positive temperature coefficient resistor connected in series with the switch;
  wherein an amount of shunted inductive energy is insufficient to extinguish an arc between the contacts; and
  passing a second portion of the inductive energy between the contacts as arc energy.

15. The method for mitigating arcing effects in an HVDC contactor of claim 14 further comprising the step of determining an apportioning between the first and the second portions based on a calculation of arc length using arc voltage and arc current as variables.

16. The method for mitigating arcing effects in an HVDC contactor of claim 15 wherein the step of determining apportioning is performed by a calculation in accordance with the expression:

$$d = \tfrac{1}{2}\epsilon * \{A/\int i * v\, dt\} * v^2$$

where:
  d=distance between the contacts=arc length;
  ϵ=permittivity of material between the contacts;
  A=area of the contacts;
  i=arc current; and
  v=arc voltage.

17. The method for mitigating arcing effects in an HVDC contactor of claim 14 further comprising the step of determining an apportioning between the first and the second portions based on a calculation of arc length using elapsed time from separating contacts as a variable.

18. The method for mitigating arcing effects in an HVDC contactor of claim 14 wherein the second portion of inductive energy is passed between the contacts as an arc that has minimum arc power required to preclude extinguishment of the arc during movement of the contacts away from one another.

* * * * *